COLOR IMAGE REPRODUCTION APPARATUS

Filed July 28, 1955 2 Sheets-Sheet 1

INVENTORS
GEORGE C. SZIKLAI &
BY ROGER D. THOMPSON
[signature]
ATTORNEY

INVENTORS
GEORGE C. SZIKLAI &
ROGER D. THOMPSON
BY
[signature]
ATTORNEY

United States Patent Office 2,792,521

Patented May 14, 1957

2,792,521

COLOR IMAGE REPRODUCTION APPARATUS

George C. Sziklai and Roger D. Thompson, Princeton, N. J., assignors to Radio Corporation of America, a corporation of Delaware Application July 28, 1955, Serial No. 525,000

9 Claims. (Cl. 315—10)

The present invention relates to new and improved color television image reproduction apparatus and, particularly, to apparatus of the type employing a cathode ray tube of the "line screen" variety.

Among the forms of color television image reproducing apparatus proposed thus far is one which includes a cathode ray kinescope having a target screen made up of a plurality of groups of strip-like elements adapted to emit light of respectively different colors in response to electron beam impingement. In the case of such a tube, means are provided causing a plurality of electron beam components to scan a raster pattern on a screen, the raster comprising a plurality of horizontal line scansions separated from each other vertically but being in the direction parallel to the group of strip-like elements. Means are additionally provided to insure tracking of the groups of color elements by the electron beam components in an orderly sequence so that the video signals representative of the respectively different component colors of the image being televised are actually employed in controlling the intensity of the beam component intended to illuminate a given color-producing element. Such means may be considered as partaking of the nature of a servo arrangement. Special element, such as ultraviolet light emitting material, may be associated with the target screen for sensing the vertical position of the electron beam components and for providing indications thereof. Means responsive to such indications are included for correcting and maintaining the proper vertical position of the beam components with respect to the screen.

It is a primary object of the present invention to provide new and improved color image reproduction apparatus of the horizontal line screen variety, which apparatus includes means for causing a plurality of electron beams to track the tube screen.

It has been proposed in the prior art to apply tag signals to the various beams of a color kinescope to obtain an indication of the vertical positioning of the beams with respect to the screen. The tag signals may comprise different frequencies or different phases of the same frequency. In the case of the differently phased tags, tracking control means comprising a phase detector for comparing the phase of the index signals produced by impingement of the tagged beams upon the index signal-producing elements with a reference signal provide a control signal for energizing a beam position correcting arrangement. As is known, however, a kinescope has a non-linear dynamic transfer characteristic or a "power law characteristic." Thus, it has been found that the phase of the index signals produced by the tag beams varies as a function of the content of the video signals which are also employed in modulating the intensity of the electron beams. Where the tags are different frequencies, the relative amplitudes of the different tag frequency components of the index signals are undesirably affected by the kinescope non-linearity.

It is, therefore, another object of the present invention to provide new and improved color image reproduction apparatus of the type employing a plurality of tag electron beams and in which the tracking information is substantially independent of video signal content.

The present invention provides means for modulating the intensity of a plurality of electron beams with tag signals. In accordance with a specific embodiment of the invention, the tag signals comprise different phases of a single frequency. The phase of the index signals produced by impingement of the tag beams upon index signal producing elements is compared with the phase of a reference signal proportional to the sum of the beam currents in the kinescope. The use of the reference signal compensates for the effects of the video signals upon the index signals.

In accordance with another form of the invention, the tag signals are waves of different frequencies and the index signals are compared with a reference signal which is proportional to the sum of the beam currents so that the tracking control signal thus afforded is substantially independent of video signal content.

Additional objects and advantages of the present invention will become apparent to those skilled in the art from a study of the following detailed description of the accompanying drawing, in which:

Fig. 1(*a*) illustrates the dynamic transfer characteristic of a typical kinescope;

Figure 1:
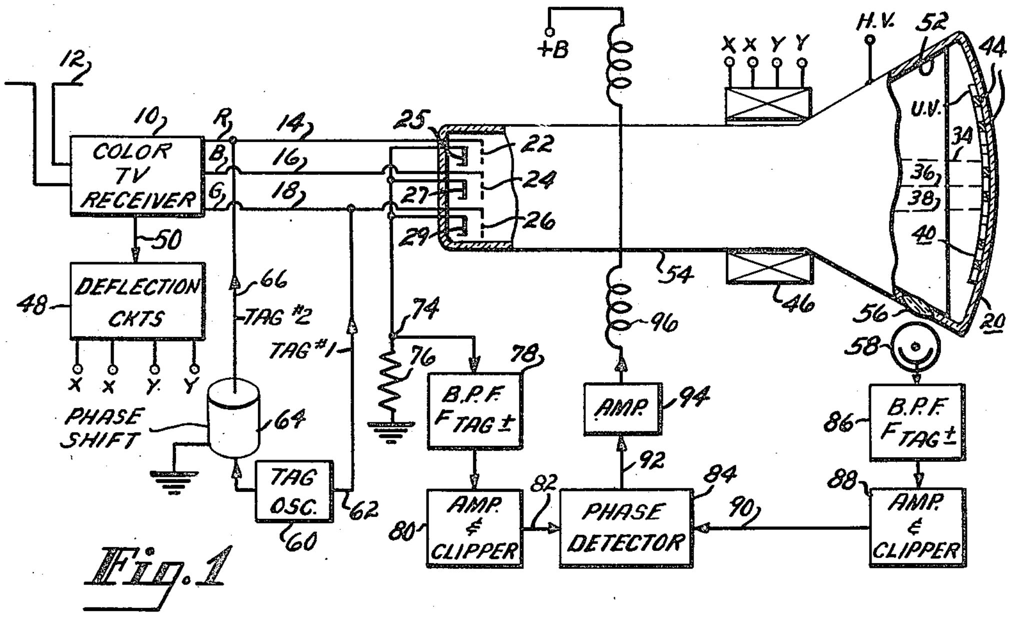
Fig. 1 illustrates, by way of a block diagram, a color television receiver embodying one form of the present invention.
Figure 1A:
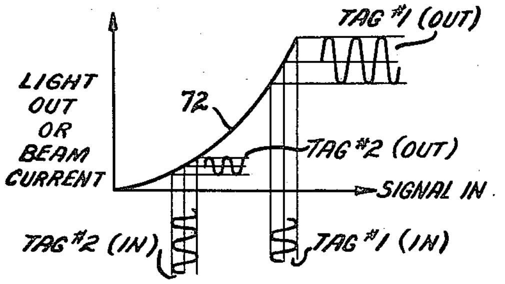

Referring to the drawing and, particularly, to Fig. 1 thereof, there is shown a color television receiver 10 adapted to receive composite television signals which are intercepted by an antenna 12. Since the form of signals and the receiver required to operate thereupon do not constitute a part of the present invention, it is sufficient to note the receiver 10 provides, at its output terminals 14, 16 and 18, video signals representative, respectively, of the brightnesses of the red, blue and green content of the television subject. By way of example, the receiver 10 may be adapted to process signals of the variety standardized by the Federal Communications Commission on December 17, 1953. Circuitry suitable for deriving red, blue and green signals may be found, for example, in the book entitled "Practical Color Television for the Service Industry," revised edition, April 1954 (second edition, first printing), published by the RCA Service Co. Inc., a Radio Corporation of America subsidiary.

The red signal lead 14 is connected operatively to the control electrode 22 of a color image reproducing kinescope 20, while the blue and green signal leads are, respectively, connected to the control electrodes 24 and 26. Associated with the control electrodes 22, 24 and 26 are, respectively, cathodes 25, 27 and 29. The cathodes 25, 27 and 29 produce, respectively, electron beams 34, 36 and 38 which are directed toward a target screen 40 made up of a plurality of groups of horizontally disposed phosphor strips R, B and G adapted, respectively, to emit red, blue and green light in response to electron beam impingement. Indexing elements in the form of strips 44 of ultra-violet light-emitting phosphor material are associated with color phosphor strips in a symmetrical fashion. That is to say, each group of color phosphor strips and index signal strips follows the following sequence: R, UV, B, UV, G. The arrangement of color and ultra-violet phosphors of the screen 40 may be better understood from the showing of Fig. 2 which also illustrates the luminescent spots produced by the beams 34, 36 and 38. These beam spots are, in the interest of simplicity, designated by the same reference numerals as those which indicate the electron beams producing the spots.

The beams 34, 36 and 38 are caused to scan a raster made up of a plurality of vertically displaced horizontal line scansions by means of electro-magnetic deflection fields produced by a conventional yoke 46 which is supplied with horizontal and vertical sawtooth deflection currents from the circuits 48. The deflection circuits 48 are caused to operate at television line and field frequencies (e. g., 15.75 kcs. and 60 cps.) by means of synchronizing signals derived from the received signals and applied by the receiver to the deflection circuits via the lead 50.

Also shown as part of conventional electrode structure of the kinescope 20 is a final anode 52 which may be in the form of an internal wall coating in the tube extending from the region of the screen 40 (and electrically connected thereto) to the region within the neck portion 54 of the kinescope. It will be further understood that the kinescope 20 also includes a first or accelerating anode (not shown) which is conventionally maintained at a suitable positive operating potential. A window 56, transparent to ultra-violet light, is provided in the conical portion of the kinescope 20 so that ultra-violet light from the strips 44 resulting from electron impingement may pass to a light-responsive photocell device 58.

In accordance with one form of the present invention, tag signals useful in causing the electron beam to track the phosphor strips in the desired manner are applied to the "red" and "green" beams 34 and 38, as follows: a source of tag signal frequency which may take the form of an oscillator 60 which produces a continuous wave is provided. The frequency of the oscillator may, for example, be 7 mcs. One phase of the 7 mcs. wave from the oscillator 60 is applied via a lead 62 to the control electrode 26 of the kinescope 20. In this manner, a first tag signal (i. e., tag No. 1) having a certain phase is applied to the electron beam 38 as intensity modulation. The wave produced by the oscillator 60 is shifted in phase as by 90°, for example, through the agency of a phase shifting apparatus which may take the form of an accurately cut delay line 64. The phase-shifted wave constitutes tag signal No. 2 and is applied via a lead 66 to the control electrode 22 of the kinescope. Thus, the electron beam 34 is intensity modulated at a 7 mcs. rate by tag signal No. 2 which is of the same frequency as tag signal No. 1 but whose phase is retarded 90° therefrom.

Figure 2:
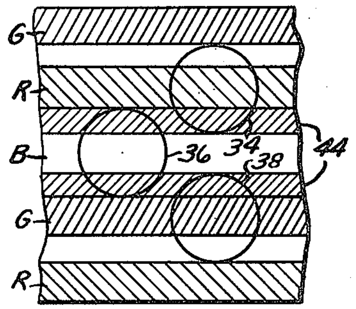
Fig. 2 is an enlarged, fragmentary view of the screen of the kinescope shown in Fig. 1.

As the beams scan horizontally across the screen 40, illuminating the phosphor strips as shown by the beam spots in Fig. 2, any vertical displacement of the beams from their normal position will produce a change in the ultra-violet light received by the photocell 58. That is, assuming that the group of beams, as by reason of scanning non-linearity, erroneously moves upwardly from its normal position, the electron beam 34, modulated by tag signal No. 2 will impinge less upon the ultra-violet strip 44 just below it, while the beam 38, modulated by tag signal No. 1, will impinge more upon the ultra-violet strip just above it. Hence, the amount of ultra-violet light modulated by tag signal No. 2 and received by the photocell 58 will increase in amplitude, while the ultra-violet light modulated by tag signal No. 1 will correspondingly decrease in amplitude. This fact is represented by the electrical indications provided in the output current of the photocell 58 in a manner which will be better understood from the showing of Fig. 3(*a*).

Figure 3:
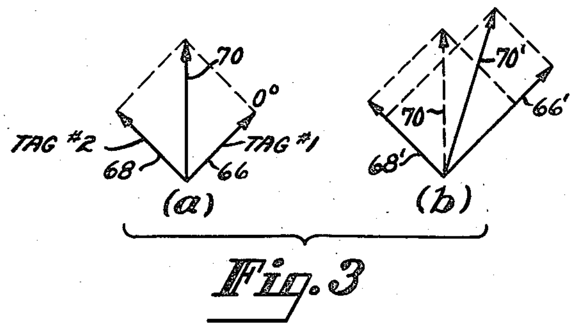
Fig. 3 illustrates certain vectorial relations to be described.

In Fig. 3, the vector 66 represents the phase of the light output of the ultra-violet strips 44 as a result of impingement by the beam 38 which is intensity modulated by tag signal No. 1. The vector 68, on the other hand, represents the phase of the light output modulated by tag No. 2 and resulting from impingement of the beam 34 upon an ultra-violet light-emitting strip 44. The vectors 66 and 68 are of equal amplitude and are angularly displaced by 90°, thus indicating the condition wherein the beams 34, 36 and 38 are properly tracking, respectively, along red, blue and green phosphor strips. That is, the ultra-violet light outputs modulated by tag No. 1 and tag No. 2 are equal, so that the resultant of the vectors 66 and 68 is as shown by the vector 70. When, as assumed in the foregoing example, the group of beams has erroneously moved upwardly, so that the beam 38 (modulated by tag No. 1) impinges more upon the ultra-violet strip 44 just above it than does the beam 34 (modulated by tag No. 2) upon the beam below it, the vector relations will be changed, so that the vector 66 is longer than the vector 68, with the result that the vector 70 is longer and displaced from the zero degree reference (i. e., the vector 66) by a smaller angle than the 45° angle which is the case when the beams are properly tracking.

As thus far described, no mention has been made of the fact that the kinescope 20 is a non-linear translating device. That is to say, the kinescope has a light-output-versus-signal-input dynamic transfer characteristic which approximates a power law curve. The effect of the non-linear transfer characteristic of the kinescope upon the tag signals is illustrated in Fig. 1(*a*) wherein the curve 72 represents the kinescope characteristic. Assuming that the image content is such that the green beam 38 is substantially brighter than the red beam 34, as indicated by the positions of the axes of tag signals No. 1 and No. 2 on the abscissa in Fig. 1(*a*), the tag signals received by the photocell 58 in the form of intensity modulated ultra-violet light will be different for the tag No. 1 from what the output of tag No. 2 is. Specifically, the amplitude of tag No. 1 in the photocell will be substantially greater than that of tag No. 2 by virtue of the curvature of the kinescope characteristic.

The foregoing facts are indicated vectorially in Fig. 3(*b*) wherein, as shown, the vector 66′ representative of tag No. 1 output is substantially longer than the vector 68′ which is indicative of tag No. 2 output. The resultant 70′ of the vectors 66′ and 68′ is also appreciably longer than the vector 70 (shown in dotted lines in Fig. 3(*b*) for convenience). Of greater importance, however, is the fact that the vector 70′ is at a smaller angle with respect to the vector 66′ than is the vector 70, thus illustrating the fact that the phase of the index signals received by the photocell 58 is directly influenced by the brightness content of the image being reproduced.

In order to overcome substantially the effect of video signal content upon the tracking control circuits which are responsive to the phase of the index signals with respect to a reference, the present invention derives its reference signal for use in detecting the phase of the index signals in a manner which automatically compensates for the video signal content. Specifically, the beam currents in the kinescope 20 follow substantially the same transfer characteristic curve as does the light output of the kinescope. Thus, in accordance with the present invention, the reference signal provided for use in detection of the phase of the index signals comprises the sum of the several beam currents in the kinescope. Since only the beams 34 and 38 are intensity modulated with tag signals, only those beam currents need be considered herein. Thus, the vectorial representations of Fig. 3(*a*) may also be understood as being representative of the tag-modulated beam currents of the beams 34 and 38.

By virtue of the fact that beam currents also are a function of the non-linear transfer characteristic of the kinescope, the phase of the resultant current (i. e., the sum of the beam currents of beams 34 and 38) changes in phase in the same manner as that described for the light signals produced by impingement of the beams 34 and 38 on the ultra-violet light-emitting phosphor elements. Thus, when the green brightness is greater than that of the red signal, the vector 66' (now representative of green beam current) is longer than the vector 68' (representative of red beam current) so that the vector 70' is seen to have a different phase from the vector 70, just as in the case of the tag-modulated light output signals of the kinescope. Stated otherwise, it will be understood from the foregoing that the sum of the beam currents in the kinescope 20 automatically changes in phase just as does the resultant index signal received by the photocell 58. Any difference, therefore, between the phase of the light index signals received by the photocell and the phase of the resultant beam current is necessarily indicative of an error in beam positioning.

In the form of the invention shown in Fig. 1, the cathodes 25, 27 and 29 are joined at a terminal 74 which is connected to a point of reference potential (e. g., ground) via a common resistor 76. The current flowing through the resistor 76 is the sum of the currents of the beams 34, 36 and 38, so that the voltage appearing across the resistor 76 constitutes a signal whose phase is a direct function of the relative intensities of the green and red electron beams which are modulated by the tag signals.

The voltage derived from the terminal 74 is applied to a bandpass filter 78 whose center frequency is equal to the tag frequency of 7 mcs. and the filtered signal is, in turn, applied to a suitable amplifying and clipping stage 80 which may be of any known variety. The function of the clipping stage 80 is that of removing any amplitude modulation from the signal at the terminals 74, so that the succeeding operations are substantially independent of signal amplitude. The clipped reference signal is then applied to one input terminal 82 of a phase detector circuit 84. The index signals received by the photocell 58 from the kinescope and converted into electrical currents are similarly filtered in a filter 86 centered about the 7 mcs. tag frequency and are also amplified and clipped in a stage 88 prior to application to a second input terminal 90 of the phase detector 84. The phase detector 84 provides at its output lead 92 a direct current signal whose polarity and amplitude are, respectively, indicative of the direction and amount by which the photocell index signal is out of phase with respect to the reference signal derived from the terminal 74. The direct current correction signal from the phase detector is amplified in a circuit 94 and applied to an auxiliary vertical deflection winding 96 such that the current caused to flow through the winding 86 produces a magnetic field designed to deflect the beams to their proper vertical positions.

Figures 4, 5:
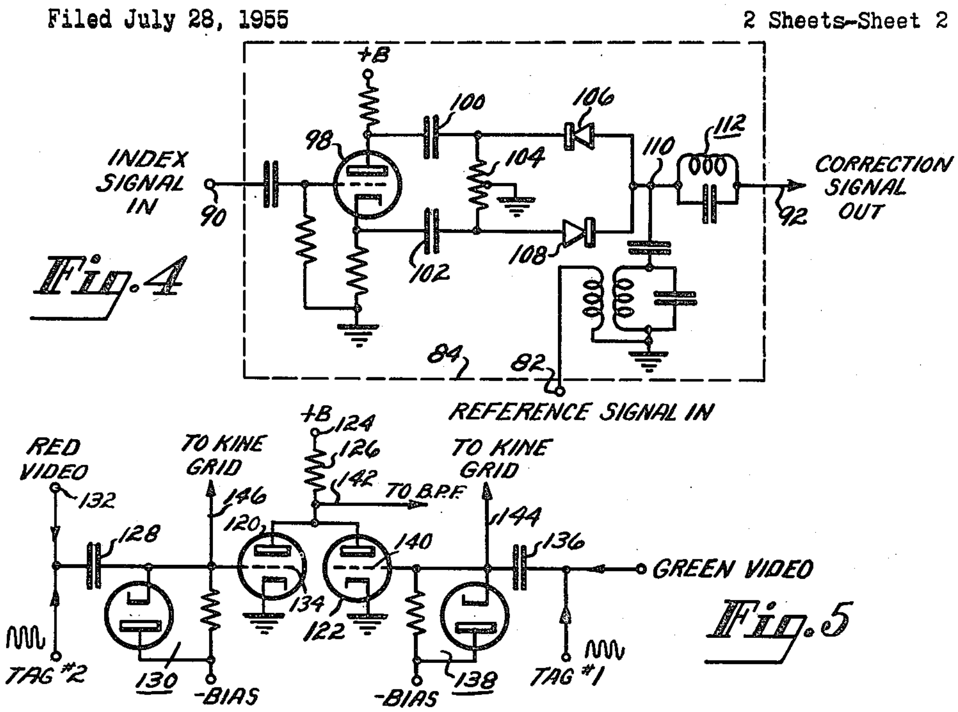
Fig. 4 is a schematic diagram of a phase detector circuit which may be employed in conjunction with the present invention.
Fig. 5 is a schematic diagram of a circuit which may be used in accordance with another form of the invention.

Fig. 4 illustrates schematically one suitable form of phase detector circuit. The index or error signal derived from the photocell 58 and amplified and limited as explained above is applied to the signal input terminal 90 of a phase splitter 98 so that opposite phases of the index signal are applied via capacitors 100 and 102 across the two halves of a resistance 104 which is center-tapped to ground, as shown. The reference tag phase signal from the amplifying and clipping stage 80 is applied to the terminal 82. Depending upon the relative phases of the reference signal and the index signal, one of the two oppositely polarized diodes 106 and 108 will conduct more heavily than the other, thereby providing a direct current voltage at the terminal 110 whose polarity and amplitude are, respectively, indicative of the direction and amount by which the index signal differs in phase from the reference signal. This output voltage or "correction" signal is applied via a resonant circuit 112 to the output lead 92 which is adapted for connection to the amplifier 94. The circuit 112 serves to trap out undesired frequencies which may be present in the correction signal from the phase detector.

It will be understood from the foregoing that, in the form of the invention depicted in Fig. 1, the reference signal which is employed in detecting the phase of the index signals derived from the kinescope comprises the sum of the currents of the electron beams in the kinescope. While, in the illustration of Fig. 1, the reference signal is derived from a common cathode load impedance across which there appears a voltage which is proportional to the sum of the beam currents in the kinescope, the reference signal may be derived from other electrodes in the kinescope such, for example, as the final anode 52. Also, the usual first anode of the kinescope ordinarily carries a current which is proportional to the beam current so that the reference signal may be derived from that electrode.

Fig. 5 illustrates schematically another form of the invention and, namely, one in which the reference signal which is proportional to the sum of the electron beam currents in the kinescope is derived from a source which simulates the non-linear dynamic transfer characteristic of the kinescope. In the illustrative embodiment of Fig. 5, the non-linear characteristic of a kinescope is simulated by a pair of diodes 120 and 122, each of which, as will be understood, has a transfer characteristic which generally approximates that of a kinescope. The anodes of the triodes 120 and 122 are connected to a source of positive operating voltage at the terminal 124 through a common load resistor 126. Red-representative video signals intended for modulation of the electron beam 34 in the kinescope are applied via a capacitor 128 and D. C. level setting network 130 from a terminal 132 (e. g., from the receiver 10) to the control electrode 134 of the triode 120. Tag signal No. 2 is also applied to the control electrode of the triode 120, so that the current in that tube is modulated both by the video signals and the tag signal. Similarly, the green-representative video signal and tag signal No. 1 are applied via a capacitor 136 and D. C. level-setting network 138 to the control electrode 140 of the triode 122.

Since the triodes 120 and 122 are selected to have substantially identical non-linear transfer characteristics matching that of the kinescope, it will be understood that the voltage appearing across the common load resistor 126 and available at the lead 142 is a signal which is generally proportional to the sum of the beam currents in the kinescope. This fact will be better understood from the showing of Fig. 5 wherein the leads 144 and 146 are designated for connection to respective ones of kinescope control grid electrodes. Stated otherwise, the control grid 134 of the triode 120 is in parallel with the control grid electrode of the kinescope which controls the red electron beam. Similarly, the control grid 140 of the triode 122 is in parallel with that control grid of the kinescope which controls the green electron beam.

The circuitry of Fig. 5 may be employed in the arrangement of Fig. 1, with the exception that the Fig. 5 circuit is substituted for the common cathode load shown in Fig. 1 and the signal lead 142 is connected to the bandpass filter 78 instead of the common cathode terminal. Since the signal produced at the lead 142 in Fig. 5 is proportional to the sum of the beam currents in the kinescope, it furnishes a reference signal which may be employed in detecting the phase of the index signals derived from the kinescope and in a manner which automatically compensates for the video signal content.

An advantage of the arrangement of Fig. 5 is that triodes have a higher gain and, therefore, afford a stronger reference signal than does the kinescope. By virtue of the fact that the triodes' control grid electrodes are in parallel with the kinescope's control electrodes, it is important to prevent the triodes from drawing grid current such that the bias of the kinescope would be undesriably affected. For this reason, it is preferable to use low-mu, high $G_m$ triodes such as the 6AS7 type.

Figure 6:
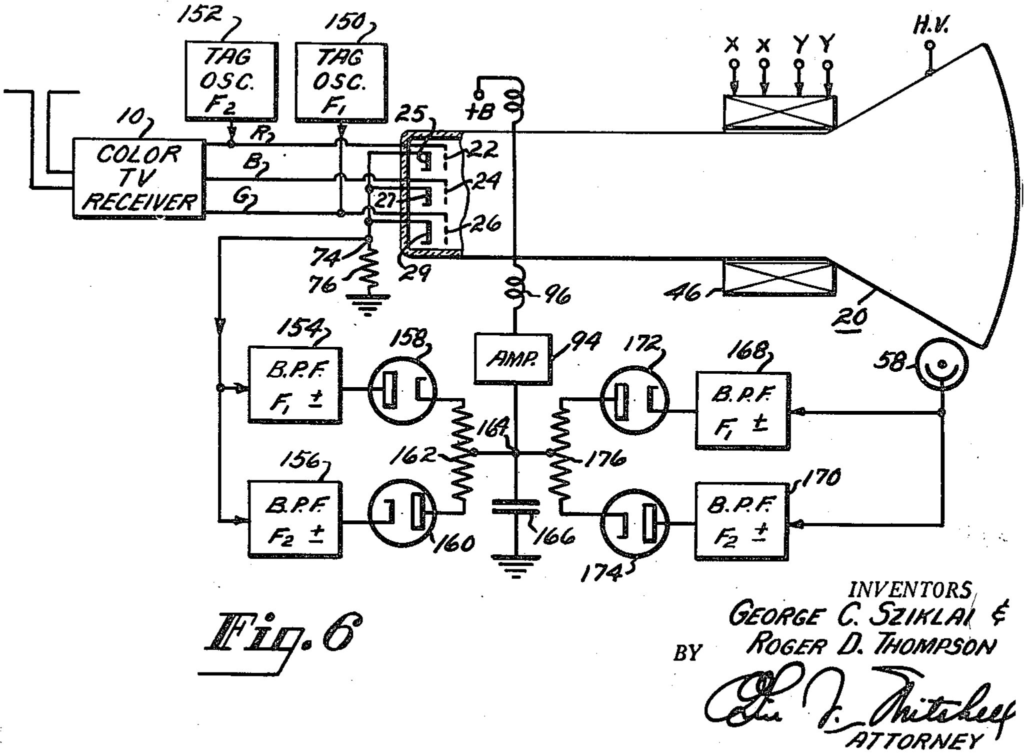
Fig. 6 is a block diagram illustrative of another form of the invention.

Throughout the foregoing, the effect of the non-linear transfer characteristic of a kinescope has been described primarily in conjunction with tag signals whose phases are distinctive. It will be understood, however, that the same effects are obtained in the case wherein the tag signals comprise different frequencies. Fig. 6 illustrates, therefore, a form of the invention wherein tag signals are applied to certain of the beams in a kinescope, which tag signals are waves of different frequencies and wherein means are provided for rendering the tracking control function substantially independent of video signal content.

In Fig. 6, reference numerals identical to those employed in Fig. 1 designate corresponding elements. Specifically, the color television receiver 10, kinescope 20, deflection yoke 46 and electron gun electrodes of the kinescope are or may be the same as those described in connection with Fig. 1. Red-, blue- and green-representative video signals are applied, respectively, to the control elements 22, 24 and 26 of the kinescope. The cathodes 25, 27 and 29 are joined at one end of a common resistor 76 the other end of which is returned to a point of reference potential. Tag signals are additionally applied to the control elements 22 and 26 for intensity modulating the electron beams controlled thereby. The tag signals are, for example, frequencies of 5 mcs. and 7 mcs. produced, respectively, by tag oscillators 150 and 152.

By virtue of the non-linear characteristic of the kinescope 20, a disparity in brightness between the red and green video signals will result in the reception by the photocell 58 of different intensities of tag frequency $F_1$ and $F_2$. Specifically, if the green content of the image being televised were to be substantially brighter than the red content, the amplitude of the tag signal $F_1$ would be substantially greater than that of tag signal $F_2$, so that the resultant frequency would be erroneously indicative of mispositioning of the beams, even though the beams are properly centered with respect to the strip-like elements of the screen In order to compensate for the effect of video signal content, the arrangement of Fig. 1 employs a reference signal which is proportional to the sum of the electron beam currents in the kinescope. For simplicity of illustration, the source of such reference signal is indicated as the common cathode resistor 76, although the arrangement such as that shown in Fig. 5 may also be used.

The reference signal is applied from the terminal 74 in Fig. 6 to parallel bandpass filters 154 and 156 whose passbands are centered, respectively, about the tag frequencies $F_1$ and $F_2$. The output signal of the filter 154 is applied to the anode of a peak detector diode 158, while the output signal of the filter 156 is applied to the cathode of a peak detector 160. In series with the diodes 158 and 160 is a common, center-tapped resistor 162. It will be understood that the voltage appearing at the center tap terminal 164, after filtering by the capacitor 166 is a direct current voltage representative of the algebraic difference between the amplitudes of the reference signals of frequencies $F_1$ and $F_2$.

In a similar manner, the electrical index signals produced by the photocell 58 are applied to the parallel bandpass filters 168 and 170 which are, respectively, centered in frequency about the tag frequencies $F_1$ and $F_2$. The output signal of the filter 168 is applied to the cathode of a peak detector 172, while the output signal of the filter 170 is applied to the anode of a peak detector 174. The common load circuit of the detectors 172 and 174 comprises a center-tapped resistor 176 whose center tap is electrically connected to the terminal 164. It will be noted that the diodes 172 and 174 associated with the waves of frequencies $F_1$ and $F_2$ are oppositely polarized from the diodes 158 and 160 which serve to detect the amplitudes of the same frequency components of the reference wave. Thus, at the center tap of the resistor 176 there is produced a D. C. voltage whose amplitude and polarity with respect to ground are, respectively, a measure of the amount and direction of difference in amplitude between the components of frequencies $F_1$ and $F_2$ of the index signals. The net voltage at the terminal 164, therefore, is a D. C. voltage indicative of the algebraic difference between index and reference signals and constitutes, therefore, an electrical indication of the amount and direction of any vertical mispositioning of the tagged beams in the kinescope 20. This voltage is amplified in a suitable stage 94 and is applied to a beam position correction winding 96 for controlling the vertical positioning of the beams in the kinescope in response to the information borne by the index signals as compared with the reference signal which is proportional to the sum of the beam currents. Since the reference signal is thus affected by video content in the same manner as are the index signals, the video signal effect is automatically compensated for in the arrangement.

Having thus described our invention, what we claim as new and desire to secure by Letters Patent is:

1. Color television image reproducing apparatus which comprises: a color image reproducing kinescope having a screen made up of a plurality of groups of horizontally oriented strip-like elements of respectively different preselected component colors and tracking index signal-producing elements associated with said strip-like elements in a regular pattern and in a fixed relation with said strip-like elements; means for producing a plurality of electron beams; deflection means for causing said beams to scan a raster on said screen, the lines of said raster being parallel to said strip-like elements; means associated with said kinescope for modulating such beams respectively with video signals representative of such preselected component colors of an image to be reproduced; means for modulating two of such beams additionally with mutually distinct first and second tracking tag signals; means associated with said kinescope for producing a reference signal proportional to the sum of the beam current components therein; means for deriving tracking index signals from said index signal-producing elements; means for comparing such tracking index signals with said reference signal to produce a tracking control signal; and means associated with said kinescope and operatively coupled to said last-named means for controlling the position of said beams in response to said tracking control signal.

2. Color television image reproducing apparatus which comprises: a color image reproducing kinescope having a screen made up of a plurality of groups of horizontally oriented strip-like elements of respectively different preselected component colors and tracking index signal-producing elements associated with said strip-like elements in a regular pattern and in a fixed relation with said strip-like elements; means for producing a plurality of electron beams; deflection means for causing said beams to scan a raster on said screen, the lines of said raster being parallel to said strip-like elements; means associated with said kinescope for modulating such beams respectively with video signals representative of such preselected component colors of an image to be reproduced; means for modulating two such beams additionally with tracking tag signals which are mutually distinct in one of the characteristics phase and frequency; means for deriving tracking index signals from said index signal-producing elements; means for producing a reference tag signal proportional to the sum of the beam currents in said kinescope; means for comparing such tracking index signals with said reference signal to produce a tracking control signal; and means associated with said kinescope for controlling the position of said beams in response to said tracking control signal.

3. Color television image reproducing apparatus which comprises: a color image reproducing kinescope having a screen made up of a plurality of groups of horizontally oriented strip-like elements of respectively different preselected component colors and tracking index signal-producing elements associated with said strip-like elements in a regular pattern and in a fixed relation with said strip-like elements; means for producing a plurality of electron beams; deflection means for causing said beams to scan a raster on said screen, the lines of said raster being parallel to said strip-like elements; means associated with said kinescope for modulating such beams respectively with video signals representative of such preselected component colors of an image to be reproduced; means for modulating two such beams additionally with tracking tag signals which are mutually distinct in one of the characteristics phase and frequency; means for deriving tracking index signals from said index signal-producing elements; means associated with said kinescope for adding the currents therein to produce a reference signal; means for comparing such tracking index signals with said reference signal to produce a tracking control signal; and means associated with said kinescope for controlling the position of said beams in response to said tracking control signal.

4. Color television image reproducing apparatus which comprises: a color image reproducing kinescope having a screen made up of a plurality of groups of strip-like elements of respectively different preselected component colors and tracking index signal-producing elements associated with said strip-like elements in a regular pattern and in a fixed relation with said strip-like elements; means for producing a plurality of electron beams; deflection means for causing said beams to scan a raster on said screen; means associated with said kinescope for modulating such beams respectively with video signals representative of such preselected component colors of an image to be reproduced; means for modulating two of such beams additionally with mutually distinct first and second tracking tag signals comprising angularly displaced phases of a tag signal frequency; means for producing a reference signal proportional to the sum of the beam currents in said kinescope; means for detecting the phase with respect to said reference signal of tracking index signals produced by said index signal-producing elements in response to electron impingement; and means responsive to said phase detecting means for controlling the position of said beams in accordance with the detected phase of such tracking index signals.

5. Color television image reproducing apparatus which comprises: a color image reproducing kinescope having a screen made up of a plurality of groups of horizontally oriented strip-like elements of respectively different preselected component colors and means for directing a plurality of electron beams toward said screen, said kinescope having a non-linear dynamic transfer characteristic; deflection means for causing said beams to scan a raster on said screen, the lines of said raster being parallel to said strip-like elements; means associated with said kinescope for modulating such beams respectively with video signals representative of such preselected component colors of an image to be reproduced; means associated with said kinescope for deriving therefrom tracking index signals whose characteristic is indicative of the position of one of such beams with respect to said index signal-producing elements, said tracking index signals being subject to amplitude variation as a function of the non-linear dynamic transfer characteristic of said kinescope; means associated with said kinescope for producing a reference signal proportional to the sum of the beam current components therein, such that the components of such reference signal are subject to amplitude variation as a function of the dynamic transfer characteristic of said kinescope; means for comparing such tracking index signals with said reference signal to produce a tracking control signal; and means associated with said kinescope and operatively coupled to said last-named means for controlling the position of said beams in response to said tracking control signal.

6. Color television image reproducing apparatus which comprises: a color image reproducing kinescope including means for directing a plurality of electron beams toward a screen made up of a plurality of groups of horizontally oriented strip-like elements of respecitvely different preselected component colors and tracking index signal-producing elements associated with said strip-like elements in a regular pattern and parallel to said strip-like elements for producing distinctive light signals in response to electron impingement, said kinescope having a non-linear dynamic transfer characteristic; deflection means for causing said beams to scan a raster on said screen, the lines of said raster being parallel to said strip-like elements; means associated with said kinescope for modulating such beams respectively with video signals representative of such preselected component colors of an image to be reproduced; means for modulating one of said electron beams with a distinctive tag signal; means associated with said kinescope for deriving therefrom tracking index signals whose characteristic is indicative of the position, with respect to said index signal-producing elements, of said beam modulated by a tag signal, said tracking index signals being subject to amplitude variation as a function of the non-linear dynamic transfer characteristic of said kinescope; means associated with said kinescope for producing a reference signal proportional to the sum of the beam current components therein, such that the components of such reference signal are subject to amplitude variation as a function of the dynamic transfer characteristic of said kinescope; means for comparing such tracking index signals with said reference signal to produce a tracking control signal; and means associated with said kinescope and operatively coupled to said last-named means for controlling the position of said beams in response to said tracking control signal.

7. Color television image reproducing apparatus which comprises: a color image reproducing kinescope including means for directing a plurality of electron beams toward a screen made up of a plurality of groups of horizontally oriented strip-like elements of respectively different preselected component colors and tracking index signal-producing elements associated with said strip-like elements in a regular pattern and parallel to said strip-like elements for producing ultra-violet light signals in response to electron impingement, said kinescope having a non-linear dynamic transfer characteristic; deflection means for causing said beams to scan a raster on said screen, the lines of said raster being parallel to said strip-like elements; means associated with said kinescope for modulating such beams respectively with video signals representative of such preselected component colors of an image to be reproduced; means for modulating one of said electron beams with a distinctive tag signal; means associated with said kinescope for deriving therefrom tracking index signals whose phase with respect to a reference is indicative of the position, with respect to said index signal-producing elements of said beam modulated by a tag signal, said tracking index signals being subject to variation as a function of the non-linear dynamic transfer characteristic of said kinescope; means associated with said kinescope for producing a reference signal proportional to the sum of the beam current components therein, such that such reference signal is subject to substantially the same variation as a function of the dynamic transfer characteristic of said kinescope as are the tracking index signals; means for comparing the phase of such tracking index signals with said reference signal to produce a tracking control signal; and means associated with said kinescope and operatively coupled to said last-named means for controlling the position of said beams in response to said tracking control signal.

8. The invention as defined by claim 6, said means in said kinescope for directing a plurality of electron beams toward said screen comprising an electrode structure forming a part of the beam current path of said kinescope and wherein said means for producing a reference signal comprises a load impedance connected in series with said electrode structure for kinescope beam currents.

9. The invention is defined by claim 6, said means for producing a reference signal proportional to the sum of the beam current components in said screen comprising an electron discharge tube having a dynamic transfer characteristic of substantially the same curvature as the non-linear characteristic of said kinescope, a load impedance connected operatively in the current conduction path of said electron discharge tube and means for deriving a signal appearing across said impedance.

References Cited in the file of this patent

UNITED STATES PATENTS

| | | |
|---|---|---|
| 2,671,129 | Moore | Mar. 2, 1954 |
| 2,737,608 | Sziklai | Mar. 6, 1956 |
| 2,750,533 | Schwartz | June 12, 1956 |